United States Patent Office 3,137,298
Patented June 16, 1964

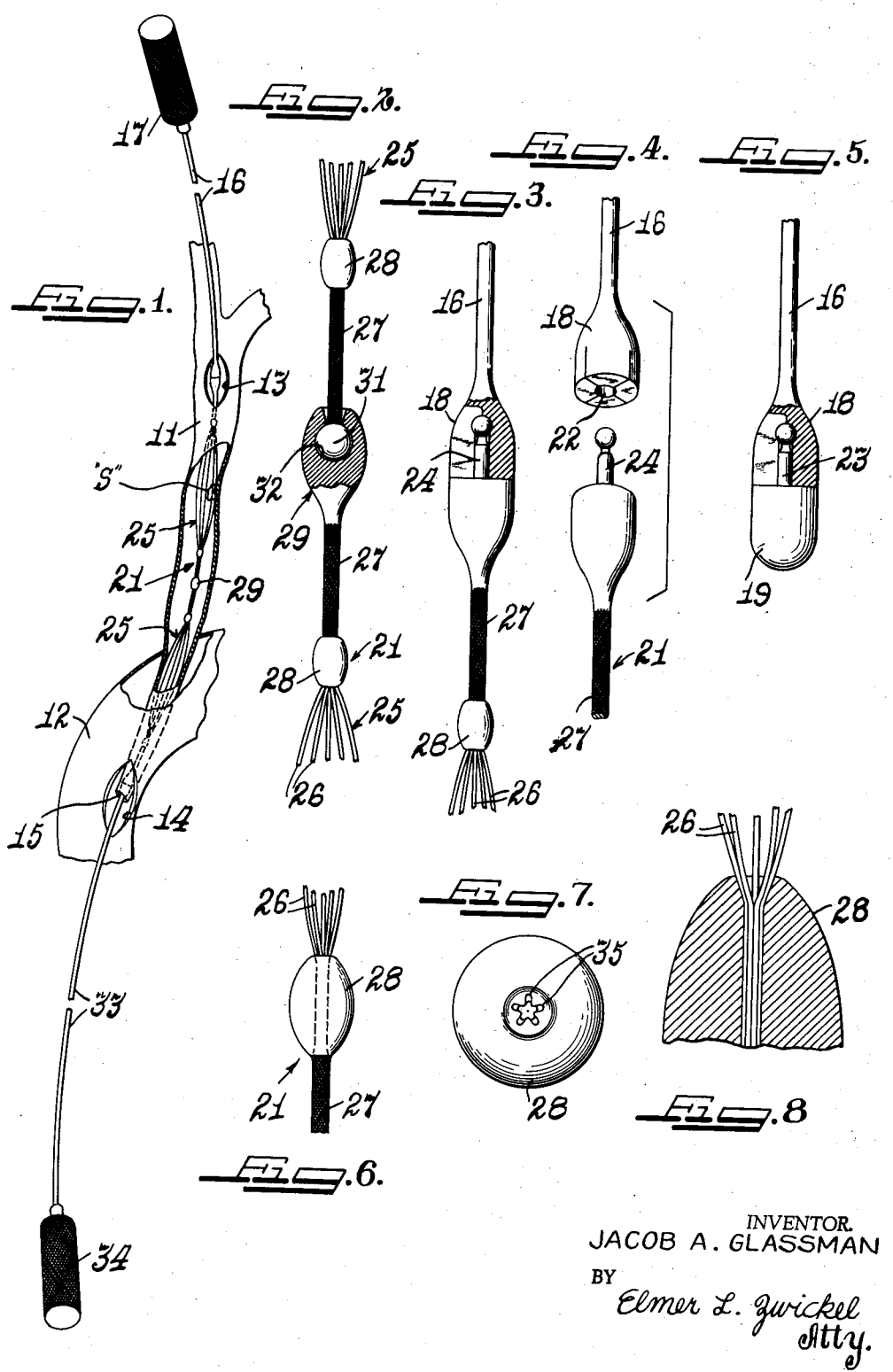

3,137,298
SURGICAL EXTRACTORS
Jacob A. Glassman, 1680 Meridian Ave.,
Miami Beach, Fla.
Filed June 25, 1963, Ser. No. 290,393
7 Claims. (Cl. 128—328)

This invention relates to improvements in surgical extractors and is more particularly concerned with the novel construction and assembly of an instrument for use in dislodging and extracting gall stones from the common bile duct irrespective of their degree of impactness or size.

The novel instrument herein disclosed is of a character similar to that shown and claimed in my co-pending application Serial No. 216,920, filed August 14, 1962, now Patent No. 3,108,594. The instrument is adapted to be drawn through, twisted, and/or reciprocated to and fro longitudinally in the common bile duct while longitudinally tensioned or untensioned so as to engage with, dislodge, and/or entrap a gall stone or stones for withdrawal from the duct. The employment of this type of novel instrument involves the practice of making a high level incised opening in the common bile duct and an incised opening in the duodenum in an area opposite to the termination of said duct (Sphincter of Oddi) in the duodenum for the entrance and exit of the instrument.

In the use of the instrument, a flexible shape-retaining wire-like probe having a removable blunt tip at its lead end may be inserted through the high level incised opening and fed into the common bile duct and, as it emerges through the Sphincter of Oddi, it is projected out through the incised opening in the duodenum (duodenostromy). The blunt tip of the probe then is removed and a novel instrument is connected thereto end to end, and is then drawn upwardly into and through the common bile duct while being tensioned, rotated and/or turned at either or both ends. The instrument may be reciprocated to and fro during passage through the duct.

The construction of the instrument is such that when the instrument is tensioned and drawn straight through, or advanced by short to and fro motions through the duct, and in some instances rotated or twisted, a multiplicity of novel stone engaging and entrapping cage-like elements therein entrap a stone or stones in such manner as to dislodge it from the bile duct lumen or wall and entrap it snugly within one of the cage-like elements. When the instrument is withdrawn from the duct, through either incised opening, the entrapped stone is withdrawn with it.

Early known types of instruments employed in bile duct stone removal are essentially curved forceps, probes or spoons that are inserted through an incised opening at the upper level of the common bile duct and either slide by or are forced past the stone or stones and are too often withdrawn back again through the same incised opening without successfully extracting the stone or stones. Such procedures are very tedious and prolonged, are frought with a high morbidity, are time consuming and very often are unsuccessful.

Known cage-type instruments of a type used only for the removal of kidney stones are too large, are trumatic in character and have only a single means for engaging the obstruction that is too often hampered by a central wire or control rod at one end of the instrument which reduces the efficiency and capacity of the instrument. Such single means instruments are used blindly because it is impossible to exercise any control over the lead end, the only unpredictable control being at the manipulating end outside of the body and extending out of the urethra.

The instrument disclosed in the aforesaid companion application includes a multiplicity of cage-like elements that are integrally connected. In use of that type of instrument difficulty is sometimes encountered in seeking to rotate the instrument. The instrument disclosed herein differs from my prior instrument in that the cage-like elements are flexibly connected for free rotation one relative to the other so as to enable the operator to selectively rotate one or both cage-like elements in the same or in opposite directions.

More specifically, the instrument herein disclosed includes a multiplicity of deformable stone dislodging and/or entrapping cage-like elements and presents a structure that affords simple manually controlled means to increase and decrease the size of, and for independently rotating, the stone dislodging and entrapping cage-like elements to facilitate stone dislodgment and insure entrapment of multi-sized and faceted gall stones.

The herein disclosed instrument is further distinquishable from the instruments disclosed in the aforesaid co-pending application wherein there is danger of the thin flexible strands defining the cage-like elements rupturing in the region where they emerge from clamp beads provided between the cage-like elements and the end portions thereof. This is overcome in the instant construction by the novel emergent opening formations in the clamp beads which allow the thin strands to bow outwardly prior to emerging from said clamp beads and hence reduce the strain imposed thereon during contraction and expansion of the cage-like elements under longitudinal stress.

It is therefore an object of the invention to provide a novelly constructed surgical extractor.

Another object is to provide a surgical extractor of a type having a plurality of interconnected cage-like elements with novel means permitting said elements to be rotated one relative to the other.

Another object is to provide a surgical extractor of a type comprised of a bundle of thin flexible strands with novel means binding the strands together at selected points along their length.

Another object is to provide a surgical instrument of the character described which is not expensive or difficult to manufacture, is simple to use and highly effective in use.

The structure by means of which the above noted and other advantages and objects of the invention are attained will be described in the following specification, taken in conjunction with the accompanying drawings, showing preferred illustrative embodiment of the invention, in which:

FIG. 1 is a schematic representative view of the common bile duct and associated organs, showing the invention in in-use position therein.

FIG. 2 is an enlarged detail view of the connection between two adjacent cage-like elements of the instrument, shown in FIG. 1.

FIG. 3 is a detail view, on an enlarged scale, of the connection between a cage-like element and the probe.

FIG. 4 is a detail perspective view of the parts shown in FIG. 3, showing them separated.

FIG. 5 is an enlarged detail view of the end of the probe, showing a blunt tip attached thereto.

FIG. 6 is an enlarged fragmentary detail view of the clamp bead at the juncture of a cage-like element and the end portion of the instrument.

FIG. 7 is an enlarged end view of the clamp bead.

FIG. 8 is an enlarged fragmentary sectional view of the clamp bead, showing the strands clamped therein.

Referring generally to the exemplary disclosure in the accompanying drawings, the improved extractor is so designed that it may be inserted through an incised opening in the duodenum at the level of the Sphincter, then through the Sphincter of Oddi and common bile duct and then finally withdrawn preferably out through a high level incised opening in the common bile duct (choledochostomy).

Ideal manipulation of the instrument is accomplished by initial insertion, through the high level incised opening, of a fine flexible shape-retaining probe, having a blunt tip removably attached to its lead end, that is easily led downwardly through the common bile duct and the Sphincter of Oddi for emergency into the duodenum where it can be viewed through the duodenostomy stoma. The probe preferably is fabricated from a thin relatively firm but pliable length of silver, copper or other metal bar stock. Upon emerging, the blunt tip on the probe is removed and said probe is then attached, by being snapped, threaded, clamped, sutured, or otherwise secured, to one end of the novel surgical extractor. The probe is then withdrawn upwardly to carry the extractor through the Sphincter of Oddi and into the common bile duct. A trailing lead may be connected to the other end of the extractor for purposes of manipulation.

As previously noted hereinabove, the surgical extractor embodies cage-like elements to dislodge and entrap an impacted stone or stones and is highly flexible and pliable so as to accommodate itself to the Sphincter of Oddi and to the variable diameters of the bile duct. When the surgical extractor is located in the duct, it is drawn through and/or reciprocated, rotated, or twisted in the duct while applying variable resistance to the trailing end, as by holding same, handles being provided for this purpose. The longitudinal pull exerted simultaneously in both directions on both ends of the extractor and which may be varied during use, results in dislodging any impacted stone or stones and the entrapping of such stone or stones in the flexible cage-like elements. The stone enters into the confines of a related cage-like element and is entrapped therein whereupon it is removed with the withdrawal of the extractor from the duct either through the opening in the common duct or through the Sphincer of Oddi. In some instances it may be necessary or advisable to move the extractor in short to and fro circular and longitudinal motions to engage and/or dislodge the stone and to then withdraw the extractor and the entrapped stone from the duct. Manipulation of the extractor may be facilitated by the presence of a long flexible extension at the trailing end, but this is not usually necessary as the instrument can be used without the probe and any extension.

The surgical extractor disclosed herein may be stretched at both ends in a longitudinal direction so as to extend or constrict the stone engaging and entrapping cage-like elements thereof and to facilitate initial passage through the Sphincter of Oddi, close tolerance with the irregular wall of the common bile duct, and final and total dislodgment and entrapment of the obstacle to be removed.

Referring now particularly to the disclosure specifically illustrated in FIG. 1, there is shown, rather diagrammatically, the anatomy of a common bile duct 11 which opens into the duodenum 12. In the herein disclosed method of and means for stone removal, an incised opening 13 is made at a high level in the common bile duct and a second incised opening 14 is made in the duodenum (duodenostomy) opposite to the site of the Sphincter of Oddi 15.

A fine blunt tipped probe 16 having end fittings and comprised of a length of fine soft deformable shape-retaining wire is preferably provided for insertion through the high level common bile duct incised opening 13 a distance sufficient to carry its lead end out through the Sphincter of Oddi and into the lower incised opening 14 in the duodenostomy stoma. The probe preferably has a removable handle 17 on one end and is formed at its other or leading end with a fitting 18 carrying a blunt tip 19 (FIG. 5) which is subsequently removed and a surgical extractor, such as that shown at 21 in FIG. 1 is attached. The fitting 18 may comprise a split socket 22 into which a stud 23 on blunt tip 19 or the stud 24 on the extractor 21 may be inserted, all as best shown in FIGS. 3 to 5. It is important that the fittings 18 and the body of stud 24 gradually diminish in size to merge with the respective elements on which they are carried so as to eliminate any abrupt shoulder which might interfere with the easy passage of the parts through the Sphincter of Oddi.

The surgical extractor, best shown in FIG. 1, is comprised of a pair of cage-like elements 25 each comprised of a bundle of fine spring wire strands 26 that are coextensive with each other and are secured together firmly at their ends to define end portions 27. These end portions preferably are braided and firm connections are afforded at the juncture of said braided end portions 27 with the related cage-like element 25 by means of clamp beads 28, although other means such as swedging, soldering, welding, etc., may be employed. The separate strands 26 are each bowed normally outwardly radially between the clamp beads 28 to provide a cage-like element that may be subjected to longitudinal and circumferential contraction medially when a pulling force is exerted longitudinally at opposite ends thereof.

In the two cage unit illustrated, the opposed ends of the two cage-like elements 25 are permanently joined as by a ball and socket swivel connection 29, which is comprised of a bead 31 on one element and a socket 32 on the other element (FIG. 2). This permits the two cage-like elements to be rotated one relative to the other during use. Independent rotation of the cage-like elements may best be effected by providing a trailing probe 33 and/or a handle 34 on the other end of the extractor, and is sometimes necessary in order to engage a cage-like element with an impacted stone without causing the companion cage-like element to rotate. Such rotation of either or both cage-like elements may be effected by manual rotation of the handle portions 17-34 in like or different directions. Obviously, more or less like cage-like elements, of the same or different lengths and normal diameters may be provided.

Now when the probe has been inserted into the duct, and is withdrawn slowly and carefully so as to draw the extractor up through the Sphincter of Oddi, and into the common bile duct 11, passage of the extractor through the Sphincter of Oddi is accomplished without trauma owing to the soft flexible nature of the extractor and deformability of the cage-like elements 25 which may be completely collapsed by applying the requisite outward resistance at both ends of the extractor.

When held at both ends and stretched, the extractor may be drawn upwardly through the duct in a straight forward direction and/or by applying a to and fro motion with intermediate increased and decreased tension. During such movement the cage-like elements 25 adjust themselves to the varying diameters of the duct simply by increasing or decreasing the tension or tautness on the ends of the extractor; and if desired, the cage-like elements may be rotated in one direction or in opposite directions or either or both oscillatably rotated while being advanced through the duct or while being held stationary insofar as advance movement is concerned. Such total manual control of the extractor causes the strands defining the cage-like elements to more effectively engage and dislodge an impacted stone "S" tangentially with the result that the stone will be carried into the interior of a cage-like element and be entrapped therein and then removed when the extractor is finally withdrawn from the upper or lower incised opening.

Clearly, the high degree of flexibility and resiliency of the extractor and the presence of a plurality of cage-like elements therealong, which maintain their fixed identity irrespective of the amount of endwise tension applied or twisting effected, adapts it to easy harmless passage through the Sphincter of Oddi and common bile duct, dilating same if necessary, and insures adequate firm, non-injurious engagement with and dislodgment of an obstacle in the duct, irrespective of its degree of impactness, and its entrapment in one or the multiplicity of cage-like elements, all during a single pass through the duct. The presence of at least two cages along the length of the extractor materially increases the chances of successful removal of a stone or stones of the same or variable size, in one passage through the duct thus making it improbable that several separate attempts must be made to dislodge and remove the stone.

In order to prevent breakage or rupture of the wire strands where they emerge from the beads 28, due to repeated flexing, it is preferred that said clamp beads be formed, at the end where the cage strands 26 emerge, with novel serrations each having a strand seated therein. This is best illustrated in FIGS. 6–8 where the bead 28 is formed with serrations 35 radially inclined outwardly to conform substantially to the normal curvature of the bowed strands. As best illustrated in FIG. 8, the strands 26 are adequately backed by the walls of serrations 35 so as to resist excessive flexing outwardly in the region of their merger with the clamped strand portions.

Although I have described a preferred embodiment of my invention in considerable detail, it will be understood that the description thereof is intended to be illustrative, rather than restrictive, as many details of the structure disclosed may be modified or changed without departing from the spirit or scope of the invention. Accordingly, I do not desire to be restricted to the exact construction described.

What I claim and desire to secure by Letters Patent of the United States is:

1. A common bile duct stone dislodging and extracting instrument comprising, in combination: a shape-retaining flexible probe terminating at one end in a tip and having length substantially greater than that of the length of the common bile duct of an adult person of average size whereby, when inserted tip end first through an incised opening in the bile duct and thence threaded through the duct into the duodenum the opposite ends of said probe will project from said bile duct and duodenum, respectively; elongate flexible hingedly jointed members extending in their in-use position in continuation of said probe from the tip end thereof; swivel means connecting said members end to end, complemental manually operable coupling means on the tip end of the probe and on the adjacent end of said elongated jointed flexible member, respectively, for securing said probe and member to one another for longitudinal movement in response to force applied to the ends thereof opposite their coupled ends; said flexible hingedly jointed elongate members each comprising bundles of thin strands of springy material secured together throughout corresponding length portions thereof extending inwardly from their opposite ends and being normally bowed radially outwardly in their corresponding intermediate length portions to form a single expansible and contractible stone-trapping cage; the construction and arrangement being such that said elongated flexible member may be drawn longitudinally through said bile duct in retracting direction exerted on the probe and further that during the course of said movement the cage may be expanded or contracted by force exerted simultaneously on said opposite ends of the probe and flexible elongate members and rotated one relative to the other.

2. A common bile duct stone dislodging and extracting instrument comprising, in combination, an elongated flexible hingedly jointed member having length substantially greater than that of the length of the common bile duct of an adult person of average size whereby, when inserted lengthwise through an incised opening in said bile duct and thence threaded through the duct into the duodenum and thence outwardly through an incised opening in said duodenum, the opposite ends of said member will project from said bile duct and duodenum, respectively; said flexible jointed elongate member comprising two bundles of thin strands of springy material each bundle secured together throughout corresponding length portions thereof extending inwardly from their opposite ends and being normally bowed radially outwardly in their corresponding intermediate length portions to form a pair of expansible and contractible stone entrapping cages; swivel means connecting said bundles end to end, the construction and arrangement being such that said elongated flexible member may be drawn longitudinally through said common bile duct and further that during the course of said movement the cages may be expanded or contracted by force exerted simultaneously on said opposite ends of the flexible elongate member and rotated one relative to the other.

3. A common bile duct stone dislodging and extracting instrument comprising, in combination: elongated flexible means adapted to be inserted through a high-level incised opening in the bile duct and thence passed longitudinally through said duct into the duodenum and thence outwardly therefrom through an incised opening provided therein and having a length such that when so placed its opposite ends will project from said bile duct and duodenum, respectively; a pair of elongated thin flexible members swivel means connecting said members end to end, said members extending in its in-use position in continuation of said flexible means; and coacting means on the distal end of the flexible means which projects from the duodenum and on the adjacent end of said flexible members for longitudinal movement in unison; said core members incorporating in their length two normally radially expanded stone dislodging and entrapping cage-like elements adapted to be constricted when pull forces are applied simultaneously to the opposite ends of said flexible means and flexible members; the construction and arrangement being such that said flexible members may be drawn through the bile duct in response to retracting movement of said flexible means and that during the course of said movement the cage-like elements may be rotated relative to each other and may be successively constricted and expanded by applying pull forces simultaneously to the remotely related ends of said flexible means and said flexible members.

4. A common bile duct stone dislodging and extracting instrument comprising, in combination: an elongated flexible member adapted to be inserted through a high-level incised opening in the bile duct and thence passed longitudinally through said duct into the duodenum and thence outwardly therefrom through an incised opening provided therein and having length such that when so placed its opposite ends will project from said bile duct and duodenum, respectively; said flexible member incorporating in its length at least two swivelly connected normally radially expanded stone extracting and entrapping cage-like elements adapted to be constricted when pull forces are applied simultaneously to the opposite ends of said member; the construction and arrangement being such that said member may be drawn through the bile duct in response to longitudinal movement of said member and that during the course of said movement the cage-like elements may be successively constricted and expanded by applying pull forces simultaneously to the remote ends of said member, and further that said cage-like elements may be rotated one relative to the other.

5. An instrument for use in the dislodging and removal of obstructions in the common bile duct comprising two bundles of thin flexible strands of springy material arranged coextensive with each other, means securing said strands in each bundle together throughout corresponding substantially equal length portions extending inwardly from the opposite ends of said strands thereby to provide end portions, swivel means connecting opposed end portions of said bundles, the strands in their corresponding intermediate length portions being normally bowed outwardly radially from the axis of said end portions to form at least a single obstruction receiving and trapping cage in each bundle, the construction and arrangement being such that said cages may be rotated relative to one another and further may be expanded and contracted during instrument movement through the duct by force applied simultaneously at both free ends of the instrument.

6. An instrument according to claim 5, wherein the free ends of said instrument are provided with coupling fittings enabling instrument manipulating components to be attached to one or both the opposite ends of the instrument.

7. An instrument according to claim 6, wherein the coupling fittings comprise snap-on elements.

References Cited in the file of this patent
UNITED STATES PATENTS 1,612,697    Cecil _____ Dec. 28, 1926